(12) United States Patent
LeBlanc et al.

(10) Patent No.: US 8,855,457 B2
(45) Date of Patent: Oct. 7, 2014

(54) OPTICAL SPLITTING COMPONENT

(75) Inventors: Thomas G. LeBlanc, Westminster, MA (US); Trevor D. Smith, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 361 days.

(21) Appl. No.: 13/446,150

(22) Filed: Apr. 13, 2012

(65) Prior Publication Data

US 2012/0263417 A1    Oct. 18, 2012

Related U.S. Application Data

(60) Provisional application No. 61/474,823, filed on Apr. 13, 2011.

(51) Int. Cl.
*G02B 6/00* (2006.01)
*G02B 6/42* (2006.01)
*G02B 6/25* (2006.01)
*G02B 6/26* (2006.01)
*G02B 6/44* (2006.01)

(52) U.S. Cl.
CPC *G02B 6/262* (2013.01); *G02B 6/25* (2013.01); *G02B 6/4453* (2013.01)
USPC .............................. 385/135; 385/48; 385/139

(58) Field of Classification Search
None
See application file for complete search history.

(56) References Cited

U.S. PATENT DOCUMENTS

| | | |
|---|---|---|
| 4,695,126 A | 9/1987 | Cook |
| 5,526,452 A | 6/1996 | Dannoux et al. |
| 6,304,688 B1 | 10/2001 | Korn et al. |
| 7,218,827 B2 | 5/2007 | Vongseng et al. |
| 7,277,620 B2 | 10/2007 | Vongseng et al. |
| 7,515,805 B2 | 4/2009 | Vongseng et al. |
| 7,519,259 B2 | 4/2009 | Smith et al. |
| 7,720,343 B2 | 5/2010 | Barth et al. |
| 7,751,672 B2 | 7/2010 | Smith et al. |
| 7,809,233 B2 | 10/2010 | Smith et al. |
| 7,809,234 B2 | 10/2010 | Smith et al. |
| 7,826,706 B2 | 11/2010 | Vongseng et al. |
| 8,184,940 B2 | 5/2012 | Smith et al. |
| 2006/0177190 A1* | 8/2006 | Vongseng et al. ............. 385/135 |

FOREIGN PATENT DOCUMENTS

| | | |
|---|---|---|
| DE | 39 10 711 A1 | 10/1990 |
| DE | 42 36 429 C1 | 5/1994 |
| JP | 59-7312 | 1/1984 |
| JP | 8-262229 | 10/1996 |
| JP | 2007-108358 | 4/2007 |

* cited by examiner

*Primary Examiner* — Jerry Rahll
(74) *Attorney, Agent, or Firm* — Merchant & Gould P.C.

(57) ABSTRACT

The present disclosure relates to an optical device that includes an optical splitting component that optically couples an optical input fiber to a plurality of optical output fibers. The optical output fibers have non-connectorized free ends that have been processed to reduce the ability of the non-connectorized free ends to reflect light back towards the optical splitting component.

11 Claims, 6 Drawing Sheets

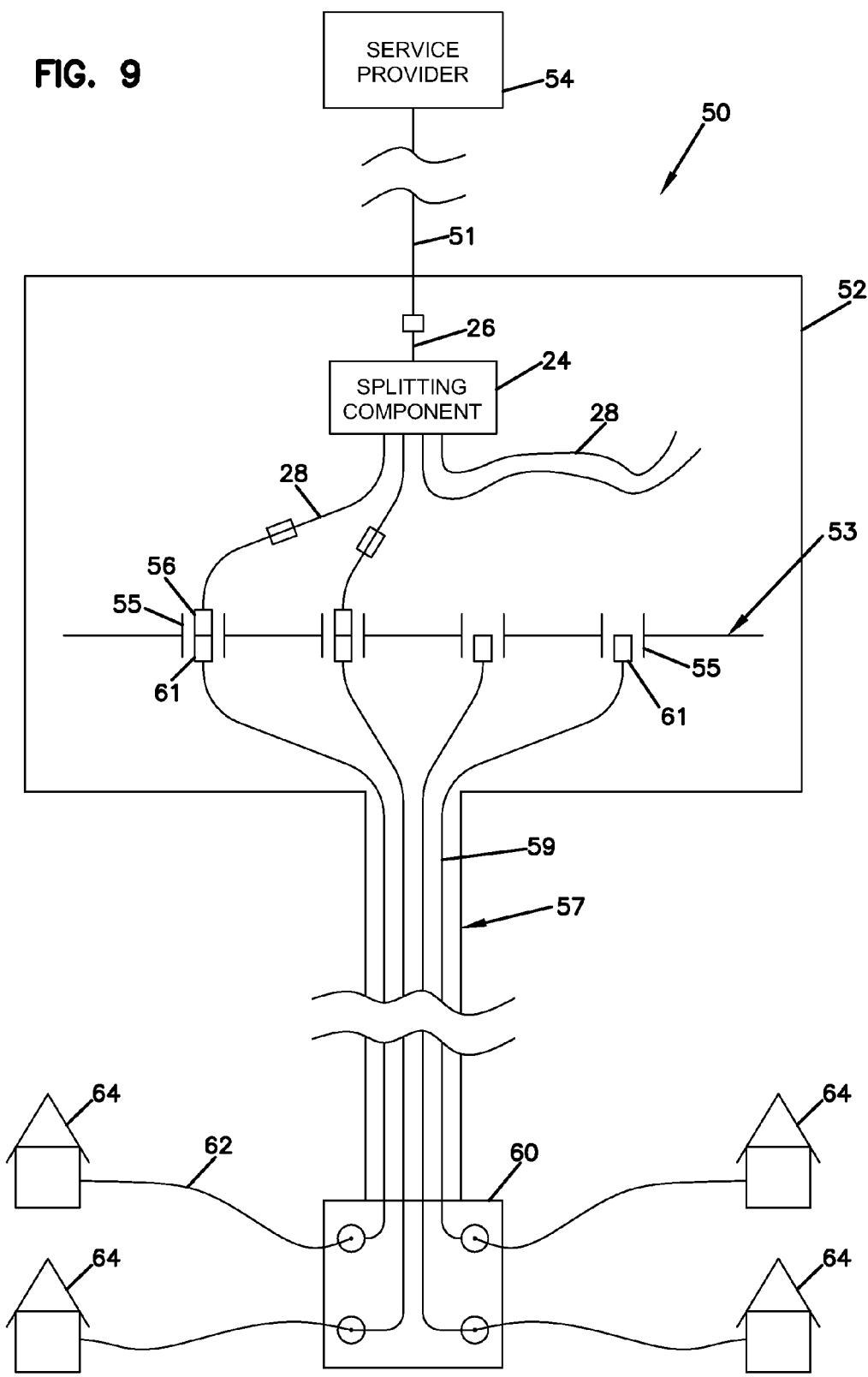

OPTICAL SPLITTING COMPONENT

CROSS-REFERENCE TO RELATED APPLICATION

The present application claims the benefit of U.S. Provisional Patent Application Ser. No. 61/474,823, filed Apr. 13, 2011, which application is hereby incorporated by reference in its entirety.

TECHNICAL FIELD

The present disclosure relates generally to equipment for fiber optic communications networks. More particularly, the present disclosure relates to optical splitting components used in fiber optic networks.

BACKGROUND

Fiber optic communication systems are becoming prevalent in part because service providers want to deliver high band width communication capabilities to customers. Fiber optic communication systems employ a network of fiber optic cables to transmit large volumes of data and voice signals over relatively long distances. A typical fiber optic network includes a system of fiber optic cables that interconnect a plurality of subscribers (also known as end users or customers) to a central location such as a central office. The system of fiber optic cables can include architecture that transitions from higher fiber count fiber optic cables (e.g., distribution cables, trunk cables, main cables, F1 cables, etc.) to lower fiber count fiber optic cables. The smallest fiber count cables (e.g., drop cables) are typically nearest to the subscribers. Enclosures (e.g., drop terminals, splice closures, optical network terminals, pedestals, aerial enclosures, etc.) are provided throughout the network for providing connection locations for interconnecting higher fiber count fiber optic cables to lower fiber count fiber optic cables.

Enclosures also can be used to house optical splitting components such as optical signal power splitters and wavelength division multiplexers/splitters. An optical splitting component is used to increase the subscriber capacity of a given network by optically connecting an optical fiber routed to the central office to a plurality of optical fibers that can be routed to separate subscriber locations. This "one-to-many" connection increases the subscriber capacity of the network.

Optical signal power splitters are capable of splitting an entire optical signal carried by one optical fiber to two or more optical fibers (e.g., 1 by 2 splitters; 1 by 4 splitters; 1 by 8 splitters, 1 by 16 splitters; 1 by 32 splitters, etc.), and are also capable of combining optical signals from multiple optical fibers back to one optical fiber. Wavelength splitting/dividing structures (e.g., coarse wavelength dividing multiplexers and de-multiplexers, dense wavelength dividing multiplexers and de-multiplexers, array waveguide grading structures, etc.) are capable dividing an optical signal carried by one optical fiber into separate wavelength ranges with each range then being directed to and carried by a separate optical fiber, and are also capable of combining separate wavelength ranges carried by separate optical fibers back to one optical fiber.

The performance of a fiber optic communication system is negatively affected by return loss. Return loss is the loss of signal power caused by optical reflection that occurs along a given optical transmission path. It is desirable to reduce return loss.

SUMMARY

Certain aspects of the present disclosure relate to optical splitting components having outputs with non-connectorized free ends that have been processed to reduce the likelihood of return loss being generated in the field by the non-connectorized free ends in the event that only some of the outputs are initially put into service.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosure herein are based.

BRIEF DESCRIPTION OF THE DRAWINGS

FIG. 9 shows a fiber optic network including the optical splitting component of FIG. 1.

DETAILED DESCRIPTION

The present disclosure relates generally to methods, processes, and devices for reducing return loss in a fiber optic communications system. In fiber optic communication systems, optical splitting components are often used to increase the subscriber capacities of the systems. For certain applications, service providers prefer to install optical splitting components manufactured with non-connectorized outputs. When this type of splitting component is put into service, the outputs of the optical splitting component needed for a particular application are connectorized in the field. For example, the outputs can be connectorized by field installed connectors or by splicing connectorized pigtails to the ends of the outputs. Only some of the outputs are immediately connectorized at the time the splitting component is put into service (e.g., the outputs dedicated to subscribers in need of immediate service). The remainder of the outputs are left non-connectorized and are reserved for future service. When the optical splitting component is optically connected to its corresponding feeder/input fiber so that service can be provided to the connectorized outputs, optical signals are directed into all of the outputs (i.e., both the connectorized outputs and the non-connectorized outputs). However, it has been determined that when such optical signals are provided to the non-connectorized outputs, the ends of the non-connectorized outputs can reflect the optical signals back through the optical splitting component and back into the input fiber thereby generating return loss in the system. Aspects of the present disclosure relate to techniques for processing the ends of the non-connectorized outputs of optical splitting components to reduce the return loss generated by the unconnectorized outputs when the optical splitting component is put into service.

Figure 1:
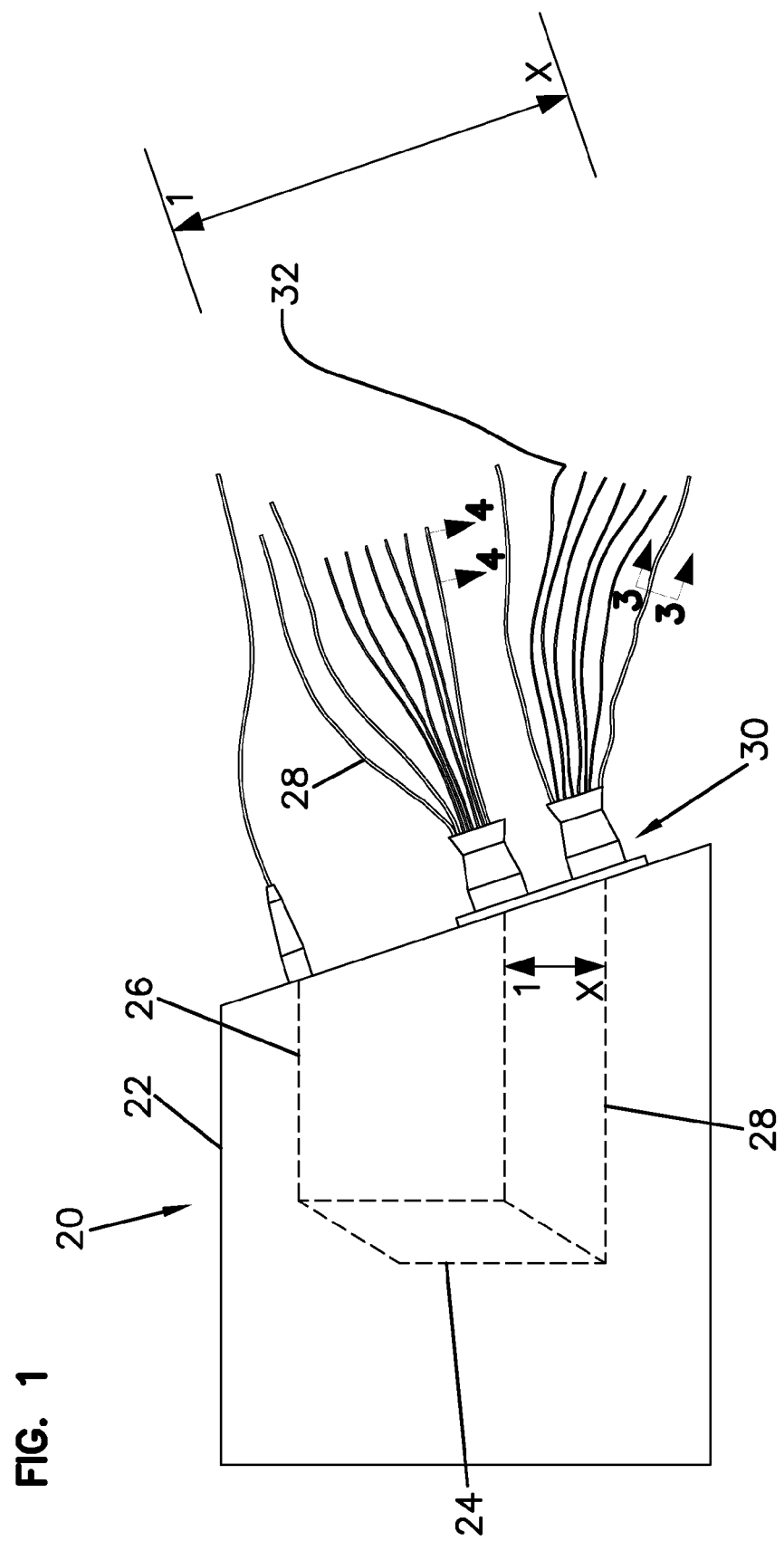
FIG. 1 is a schematic view of an optical splitting component in accordance with the principles of the present disclosure.
Figure 2:
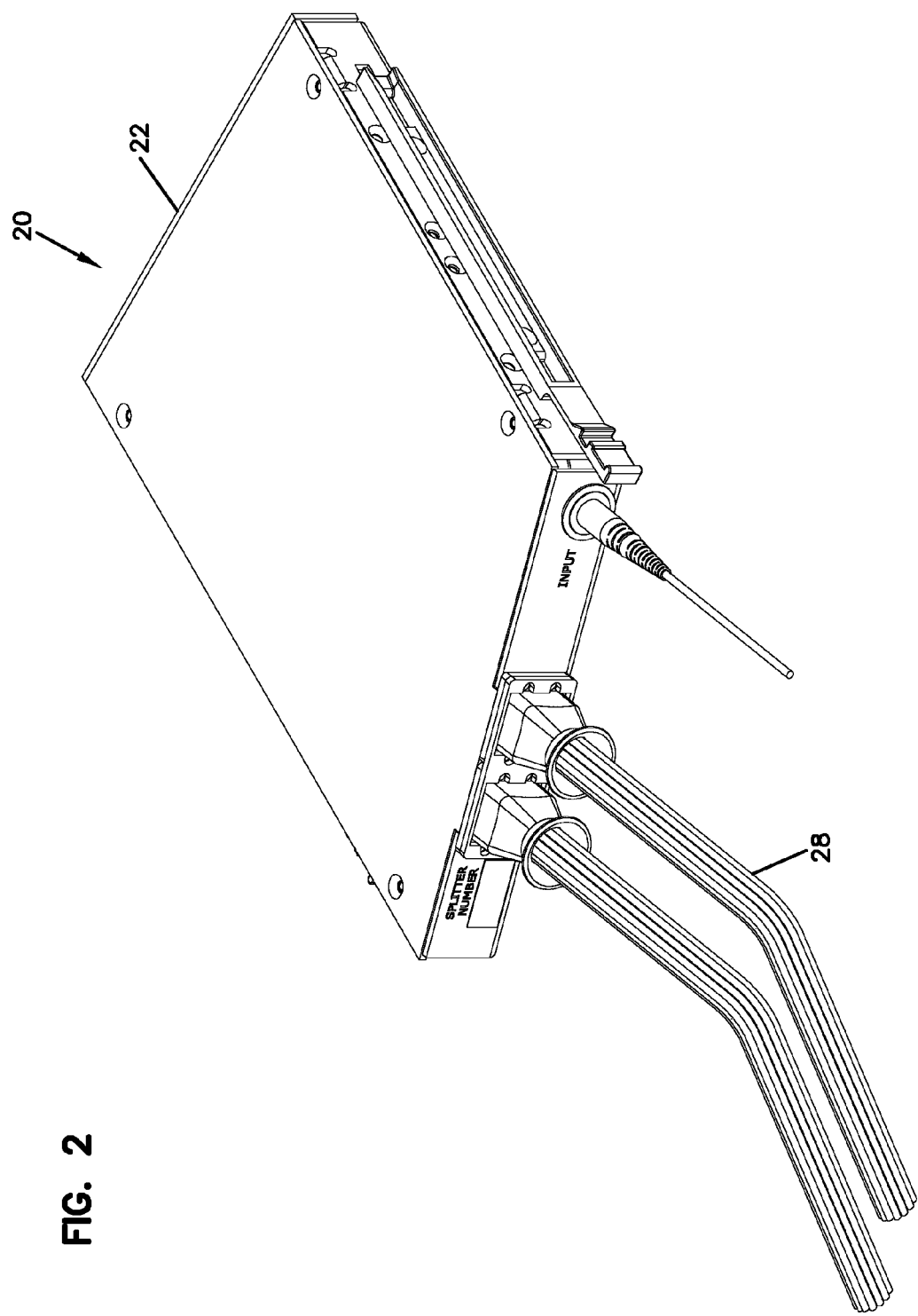
FIG. 2 is a perspective view of the optical splitting component of FIG. 1.

FIGS. 1 and 2 depict an optical splitter module 20 in accordance with the principles of the present disclosure. The optical splitter module 20 includes an outer housing 22 in which an optical splitting component 24 (i.e., an optical splitting component) is mounted. The optical splitting component 24 optically connects an input optical fiber 26 to a plurality of output optical fibers 28 (e.g., x output fibers). Example splitting ratios include 1 to 2, 1 to 4, 1 to 8, 1 to 16, 1 to 32, 1 to 64 and so on. The output optical fibers 28 are routed out of the housing 22 at one or more output locations 30. The portions of the optical fibers 28 located outside the housing 22 can form pigtails having non-connectorized free ends 32.

Figure 3:
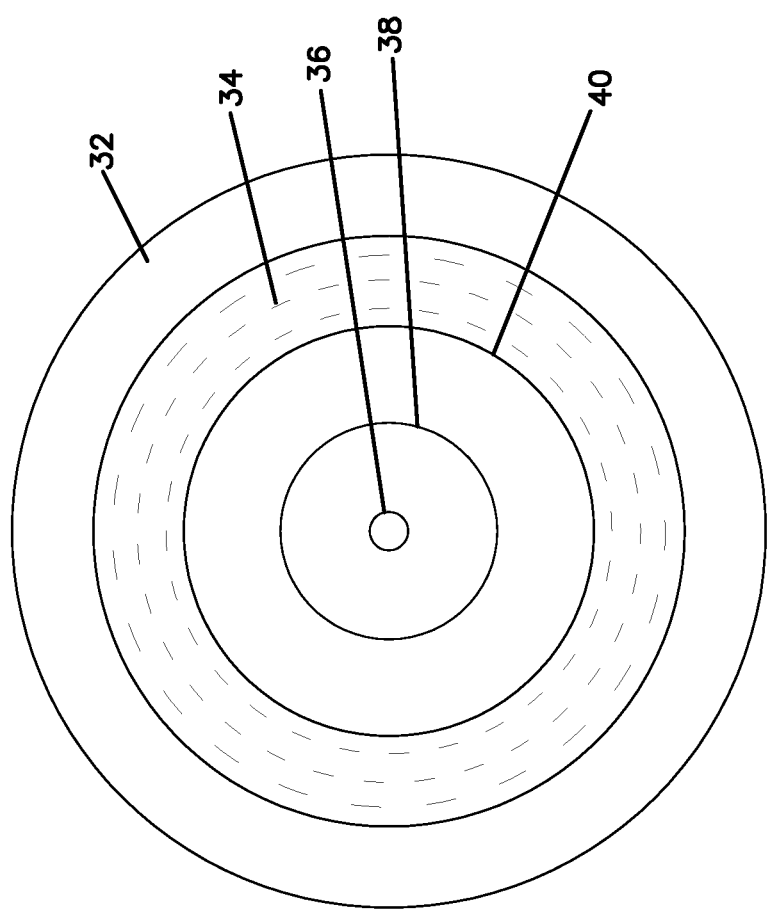
FIG. 3 is a cross-sectional view taken along section line 3-3 of FIG. 1.

As shown at FIG. 3, in certain embodiments, the portion of each output optical fiber 28 located outside the housing 22 can be enclosed within an optional protective outer jacket 32 and optional tensile reinforcing structures, such as aramid yarns 34, can be provided between the optical output fiber 28 and the jacket 32. Each output optical fiber 28 can include a core 36 surrounded by cladding layer 38 and one or more coating layers 40. The core 36 and the cladding layer 38 can be made of a light transmissive material, such as glass, with the core 36 having a different index of refraction as compared to the cladding layer 38 such that optical signals can be propagated along the core 36 via total internal reflection. The coating layers 40 can be made of a polymeric material, such as acrylate, that protects cladding and the core.

Example optical splitting components 24 include signal power splitters and wavelength division multiplexers/splitters. Optical power splitters are capable of splitting an entire optical signal carried by one optical fiber to two or more optical fibers (e.g., 1 to 2 splitters; 1 to 4 splitters; 1 to 8 splitters, 1 to 16 splitters; 1 to 32 splitters, etc.), and also are capable of combining optical signals from multiple fibers back to one optical fiber. Wavelength splitting/dividing structures (e.g., coarse wavelength dividing multiplexers and de-multiplexers, dense wavelength dividing multiplexers and de-multiplexers, array waveguide grading structures, etc.) are capable of dividing an optical signal carried by one optical fiber into separate wavelength ranges with each range then being directed to and carried by a separate optical fiber, and also are capable of combining separate wavelength ranges carried by separate optical fibers back to one optical fiber.

Figure 4:
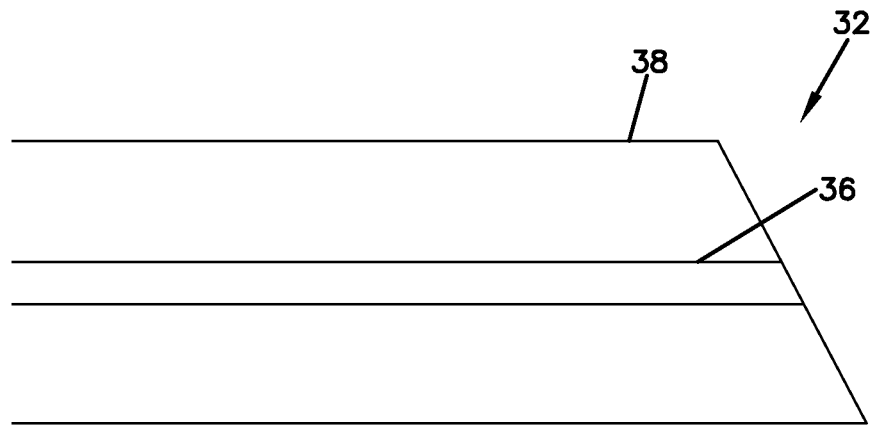
FIG. 4 is a cross-sectional view taken along section line 4-4 of FIG. 1 showing a processed free end of one of the output optical fibers of the optical splitting component of FIG. 1.
Figure 5:
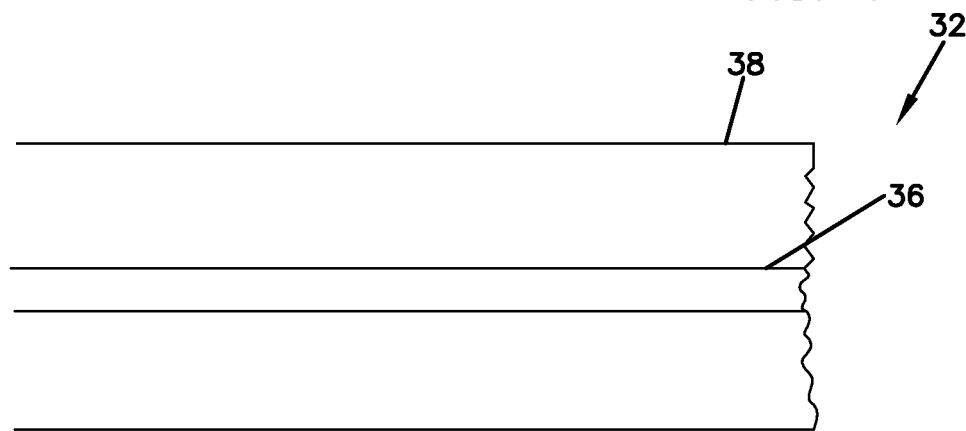
FIG. 5 is an alternative configuration for the processed free end of one of the output optical fibers of the optical splitting component of FIG. 1.
Figure 6:
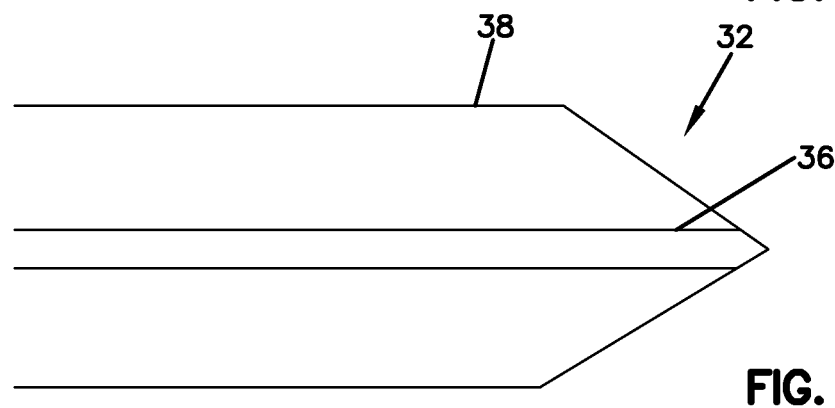
FIG. 6 is another alternative configuration for the processed free end of one of the output optical fibers of the optical splitting component of FIG. 1.
Figure 7:
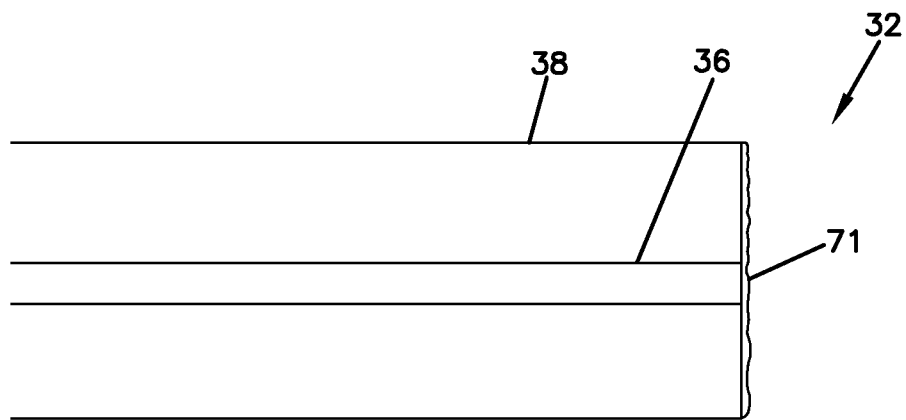
FIG. 7 is a further alternative configuration for the processed free end of one of the output optical fibers of the optical splitting component of FIG. 1.
Figure 8:
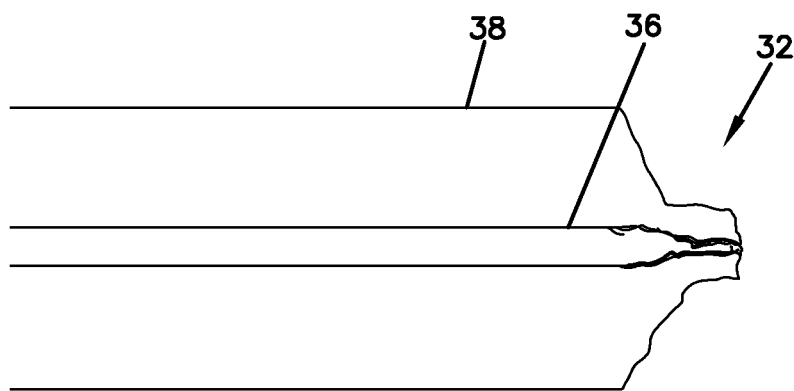
FIG. 8 is a further alternative configuration for the processed free end of one of the output optical fibers of the optical splitting component of FIG. 1.

To reduce or inhibit return loss generated by the non-connectorized free ends 32 of the output fibers 28 when the splitter module 20 is put into service, the non-connectorized free ends 32 can be processed to reduce the ability of the unconnectorized free ends 32 to reflect light back toward the optical splitting component 24. The processing can take place in the factory at the time the splitter module 20 is manufactured or in the field. In one embodiment, the non-connectorized free ends 32 can be processed by angling the core 36 end face (see FIG. 4) via a cutting or polishing process. In another embodiment, the non-connectorized free ends 32 can be processed by damaging/deforming the core 36 end face (see FIG. 5) via an abrasion process, a heating process, or other process. In a further embodiment, the non-connectorized free ends 32 can be processed by at least partially angling the core 36 end face (see FIG. 6) or by forming multiple angles on the core end face via a cutting process, a polishing process, a crushing process, or other processes. In still another embodiment, the non-connectorized free ends 32 can be processed by covering or coating the core 36 end face (see FIG. 7) with a layer of material 71 that does not have light reflective properties. In a further embodiment, the non-connectorized free ends 32 can be processed by at least partially crushing the end of the core 36 (see FIG. 8).

FIG. 9 depicts a fiber optic communication system 50 including the splitting component 24 of FIGS. 1 and 2. The splitting component 24 is shown mounted within a re-enterable enclosure 52, such as a fiber distribution hub. Example fiber distribution hubs are disclosed at U.S. Pat. Nos. 7,720,343 and 7,751,672, which are hereby incorporated by reference in their entireties. A termination field 53 including a plurality of fiber optic adapters 55 is located within the enclosure 52. A distribution cable 57 is routed from the enclosure 52 to a drop terminal 60. The distribution cable 57 includes a plurality of optical fibers 59 having connectorized ends 61 inserted in the adapters 55. Drop lines 62 run from the drop terminal 60 to subscriber locations 64 to optically connect the optical fibers 59 to the subscriber locations 64.

The input fiber 26 of the splitting component 24 is optically connected to a feeder fiber 51 (e.g., via a splice) from a service provider 54 (e.g., a central office of the service provider) so that service can be provided to the optical splitting component 24. Some of the output fibers 28 of the splitting component 24 have been connectorized via connectors 56 (e.g., standard fiber optic connectors such as SC connectors, LC connectors or other types of connectors). In one embodiment, the output optical fibers 28 are connectorized by cleaving off the processed ends of the output optical fibers 28, and then splicing connectorized pigtails to the cleaved ends. The connectors 56 can be inserted in the adapters 55 to couple the connectorized ends of the connectorized output fibers 28 to the connectorized ends 61 of the fibers of the distribution cable 57. In this way, the connectorized output fibers 28 are optically connected to selected subscriber locations. The output fibers 28 that are not connectorized are reserved for use in providing future service. While such output fibers 28 remain non-connectorized, the processing provided at the non-connectorized ends of the output fibers inhibits signals directed from the feeder fiber through the splitting component 24 to the non-connectorized output fibers 28 from being reflected back through the splitting component 24 to the feeder fiber.

As the term is used herein, "inhibiting return loss" does not require a complete absence of reflected signals at the non-connectorized ends of the output fibers 28. Rather, the processes and the resulting processed, non-connectorized ends described herein produce significant improvement in return loss performance as compared to the return loss resulting from a standard 90° cleave.

From the foregoing detailed description, it will be evident that modifications and variations can be made in the devices of the disclosure without departing from the spirit or scope of the invention.

The invention claimed is:

1. An optical device comprising:
   an optical splitting component optically coupling an optical input fiber to a plurality of optical output fibers, the optical output fibers having non-connectorized free ends that have been processed to reduce the ability of the non-connectorized free ends to reflect light back towards the optical splitting component.

2. The optical device of claim 1, wherein the optical output fibers have cores, and wherein the cores are damaged adjacent the non-connectorized free ends.

3. The optical device of claim 2, wherein the cores are crushed.

4. The optical device of claim 1, wherein the optical output fibers have cores having end faces at the non-connectorized free ends, and wherein the end faces are angled relative to longitudinal axes of the cores.

5. The optical device of claim 1, wherein the optical output fibers have cores having end faces that have been deformed.

6. The optical device of claim 1, wherein the optical output fibers have cores having end faces that have been defaced.

7. The optical device of claim 1, wherein the optical output fibers have cores having end faces that have been abraded.

8. The optical device of claim 1, wherein the optical output fibers have cores having end faces that have been covered with a non-reflective coating.

9. A method of making and distributing optical splitting components comprising:
   providing an optical splitting component optically coupling an optical input fiber to a plurality of optical output fibers, the optical output fibers having non-connectorized free ends;
   processing the non-connectorized free ends to reduce the ability of the non-connectorized free ends to reflect light back towards the optical splitting component; and
   after the non-connectorized free ends have been processed, distributing the optical splitting component while the free ends remain non-connectorized.

10. The method of claim 9, wherein the optical splitting component is distributed to a communication service provider.

11. A method for placing an optical splitting component in service within a fiber optic communication network, the optical splitting component optically coupling an optical input fiber to a plurality of optical output fibers, the optical output fibers having non-connectorized free ends including processed portions that are configured reduce the ability of the non-connectorized free ends to reflect light back towards the optical splitting component, the method comprising:
   removing the processed portion of a first optical output fiber of the plurality of optical output fibers;
   connectorizing the first optical output fiber and optically coupling the first optical output fiber to a first subscriber;
   optically coupling the optical input fiber to a feeder fiber;
   providing service to the first subscriber corresponding to the first optical output fiber, wherein as service is provided to the first subscriber at least some of the optical output fibers remain non-connectorized with the processed portions of the non-connectorized optical output fibers inhibiting significant return loss from being generated at the free ends of the non-connectorized optical output fibers.

\* \* \* \* \*